United States Patent
Zhang et al.

(10) Patent No.: US 12,423,378 B2
(45) Date of Patent: Sep. 23, 2025

(54) ELECTRONIC DEVICE HAVING GRAPHICS PROCESSOR AND ACCELERATION METHOD THEREOF

(71) Applicant: GlenFly Technology Co., Ltd, Shanghai (CN)

(72) Inventors: Wei Zhang, Shanghai (CN); Deming Gu, Shanghai (CN)

(73) Assignee: GLENFLY TECHNOLOGY CO., LTD, Shanghai (CN)

( * ) Notice: Subject to any disclaimer, the term of this patent is extended or adjusted under 35 U.S.C. 154(b) by 959 days.

(21) Appl. No.: 17/228,895

(22) Filed: Apr. 13, 2021

(65) Prior Publication Data

US 2022/0100814 A1    Mar. 31, 2022

(30) Foreign Application Priority Data

Sep. 29, 2020  (CN) .......................... 202011048270.1

(51) Int. Cl.
*G06F 17/16* (2006.01)
*G06F 17/15* (2006.01)
(Continued)

(52) U.S. Cl.
CPC .............. *G06F 17/16* (2013.01); *G06F 17/15* (2013.01); *G06T 1/20* (2013.01); *G06T 1/60* (2013.01)

(58) Field of Classification Search
CPC ........ G06F 17/15; G06F 17/153; G06F 17/16; G06F 7/5443; G06F 12/0875;
(Continued)

(56) References Cited

U.S. PATENT DOCUMENTS 10,255,547 B2 * 4/2019 Woolley, Jr. ......... G06V 30/142
11,308,574 B2    4/2022 Ould-Ahmed-Vall et al.
2021/0390367 A1 * 12/2021 Liu ..................... G06F 9/30105

FOREIGN PATENT DOCUMENTS

CN    100583162 C    1/2010
CN    106919942 A    7/2017
(Continued)

OTHER PUBLICATIONS

Chinese language Notice of Allowance dated Aug. 30, 2022, issued in application No. TW 110103971.

*Primary Examiner* — Carlo Waje
(74) *Attorney, Agent, or Firm* — McClure, Qualey & Rodack, LLP

(57) ABSTRACT

A graphics processor includes a texel unit and an execution unit. The texel unit includes a loading module. The execution unit includes an im2col module to execute an im2col algorithm to expand an original matrix to obtain an expansion matrix according to the size of a kernel. The execution unit multiplies the expansion matrix and the kernel to obtain a feature map matrix. The loading module calculates feature coordinates of each element of the feature map matrix according to the coordinates of the expansion matrix, and obtains the original coordinates of each element of the original matrix according to the feature coordinates, the size of the kernel, a stride, and padding. The loading module reads at least one of the memory blocks covered by the original coordinates of each element of the original matrix, and outputs data corresponding to the original coordinates in the memory blocks.

14 Claims, 9 Drawing Sheets

(51) Int. Cl.
*G06T 1/20* (2006.01)
*G06T 1/60* (2006.01)

(58) Field of Classification Search
CPC ........ G06F 2212/454; G06F 2212/455; G06N 3/063; G06T 1/20; G06T 1/60
See application file for complete search history.

(56) References Cited

FOREIGN PATENT DOCUMENTS

| | | |
|---|---|---|
| CN | 107341761 A | 11/2017 |
| TW | 201935408 A | 9/2019 |
| WO | 2005/124692 A1 | 12/2005 |

* cited by examiner

ELECTRONIC DEVICE HAVING GRAPHICS PROCESSOR AND ACCELERATION METHOD THEREOF

CROSS REFERENCE TO RELATED APPLICATIONS

This application claims priority to and the benefit of China Application No. 202011048270.1, filed on Sep. 29, 2020, the entirety of which is incorporated by reference herein.

FIELD OF THE INVENTION

The invention relates to a graphics processor, especially one relating to a graphics processor and the acceleration method thereof for improving im2col calculation efficiency.

DESCRIPTION OF THE RELATED ART

With the development of artificial intelligence, using a graphics processing unit (GPU) to accelerate neural networks has become an important direction of research. In order to perform hardware acceleration on neural network algorithms, various chip manufacturers continue to improve the performance of computing modules, to reduce the instances of data access in a memory, and to design optimization algorithms, which makes neural network inference performance faster and faster. General Matrix Multiplication (GEMM) is a widely used convolution acceleration method. Before executing GEMM, input data needs to be prepared, and the process of preparing the input data is called im2col.

When a traditional graphics processor executes GEMM, a matrix must first be read from the memory. An im2col operation is performed on the matrix, and the resulting data from the im2col operation is stored in the memory. Then, the traditional graphics processor uses the resulting data of the im2col operation as the input data of GEMM to perform matrix multiplication operations. In other words, the traditional graphics processor needs to read the memory twice during the execution of a GEMM, which increases demand for bandwidth. The traditional graphics processor needs to perform two calculations to get the final matrix multiplication result, so that the calculation time and inference time becomes longer.

BRIEF SUMMARY OF THE INVENTION

In order to resolve the issues described above, an embodiment of the invention provides a graphics processor for accelerating a convolution calculation. The graphics processor includes a texel unit and an execution unit. The texel unit includes a loading module. The execution unit includes an im2col module. The loading module reads an original matrix for the convolution calculation from a memory. The memory includes a plurality of memory blocks, each of which is adjacent to another and is the same size. The original matrix is stored in at least one of the memory blocks. The im2col module executes an im2col algorithm, and expands the original matrix to obtain an expansion matrix according to the size of a kernel. The execution unit defines expansion coordinates of each element in the expansion matrix. The execution unit multiplies the expansion matrix and the kernel to obtain a feature map matrix corresponding to the original matrix. The loading module receives the expansion coordinates from the execution unit, calculates feature coordinates of each element of the feature map matrix according to the expansion coordinates, and obtains the original coordinates of each element of the original matrix according to the feature coordinates, the size of the kernel, a stride, and padding. The loading module reads the memory blocks covered by the original coordinates of each element of the original matrix, and sends the data corresponding to the original coordinates in the memory blocks to the im2col module.

An embodiment of the invention also provides a method for accelerating a convolution calculation. The method includes receiving an original matrix from a memory, wherein the memory comprises a plurality of memory blocks, each of which is adjacent to another and is the same size, and the original matrix is stored in at least one of the memory blocks; executing an im2col algorithm, and expanding the original matrix to obtain an expansion matrix according to the size of a kernel, wherein each element in the expansion matrix has expansion coordinates; multiplying the expansion matrix and the kernel to obtain a feature map matrix corresponding to the original matrix; calculating feature coordinates of each element of the feature map matrix according to the expansion coordinates; obtaining original coordinates of each element of the original matrix according to the feature coordinates, the size of the kernel, a stride, and padding; reading the memory blocks covered by the original coordinates of each element of the original matrix, and outputting the data corresponding to the original coordinates in the memory blocks.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, the size of components may be arbitrarily enlarged or reduced in the figures for clarity of illustration.

FIG. 5A is a schematic diagram of an original matrix in accordance with some embodiments of the disclosure.

FIG. 5B is a schematic diagram of the expansion matrix of the original matrix in FIG. 5A in accordance with some embodiments of the disclosure.

DETAILED DESCRIPTION OF THE INVENTION

Figure 1:
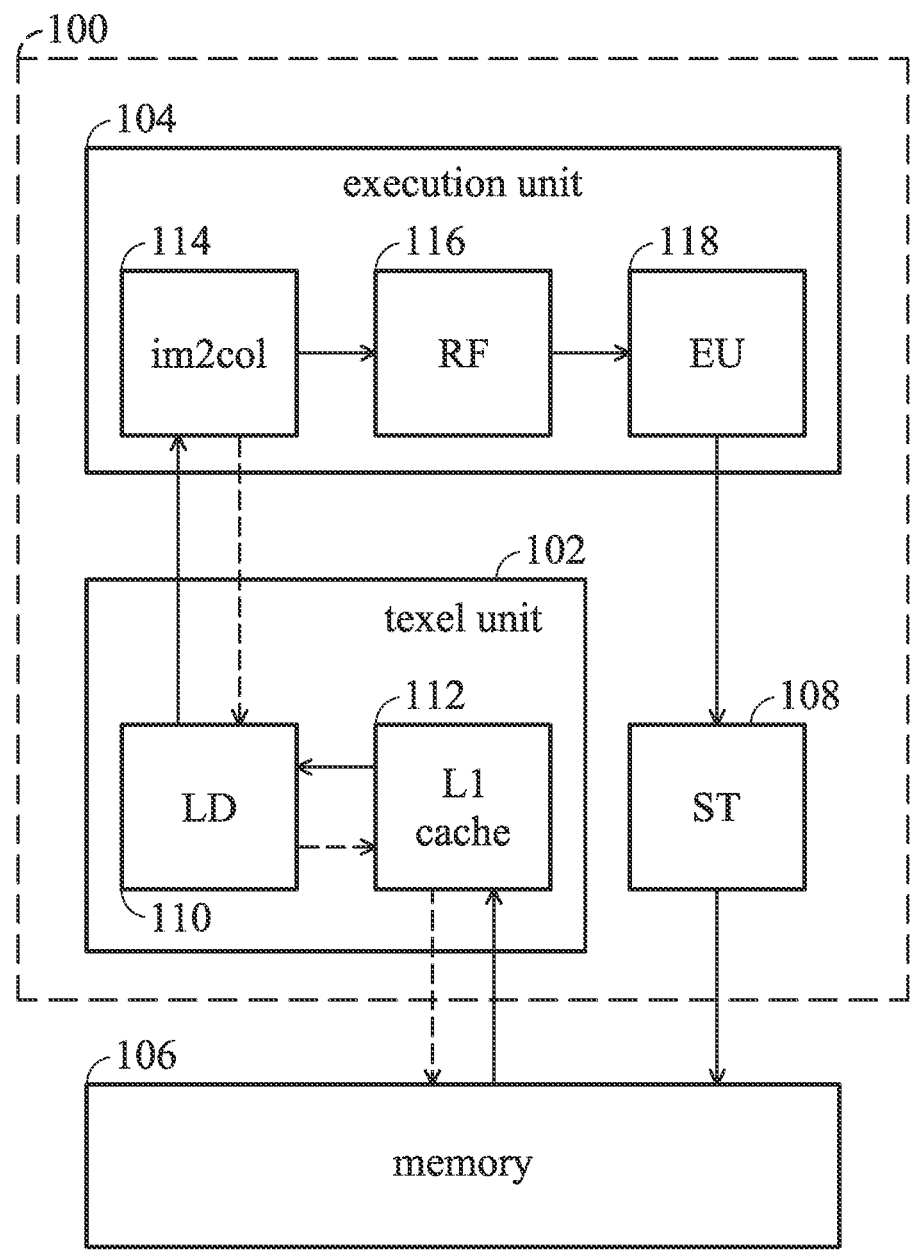
FIG. 1 is a schematic diagram of a graphics processor in accordance with some embodiments of the disclosure.

FIG. 1 is a schematic diagram of a graphics processor 100 in accordance with some embodiments of the disclosure. As shown in FIG. 1, the graphics processor 100 includes a texel unit 102, an execution unit 104, and a storage unit 108 (ST). The texel unit 102 includes a loading module 110 (LD), an L1 cache 112. The execution unit 104 includes an im2col module 114 (im2col), a register file 116 (RF), and an execution module 118 (EU). In some embodiments, the graphics processor 100 is arranged in an electronic device. The electronic device may be, for example, a laptop, a desktop, a smart mobile device, a tablet, and a work station server. The electronic device may include another processor, such as a central processing unit (CPU), to correspondingly send instructions (such as matrix calculation instructions) (not shown) to the graphics processor 100 according to user's operations.

When the graphics processor 100 receives a GEMM instruction from a CPU, the loading module 110 in the texel unit 102 reads an original matrix for a convolution calculation (such as matrix multiplication calculations). In some embodiments, the original matrix may represent an input image which is input in a convolution neural network (CNN). CNN is used to perform image recognition operations on the input image. In some embodiments, the original matrix is stored in a memory 106 by a specific data configuration.

Figure 2:
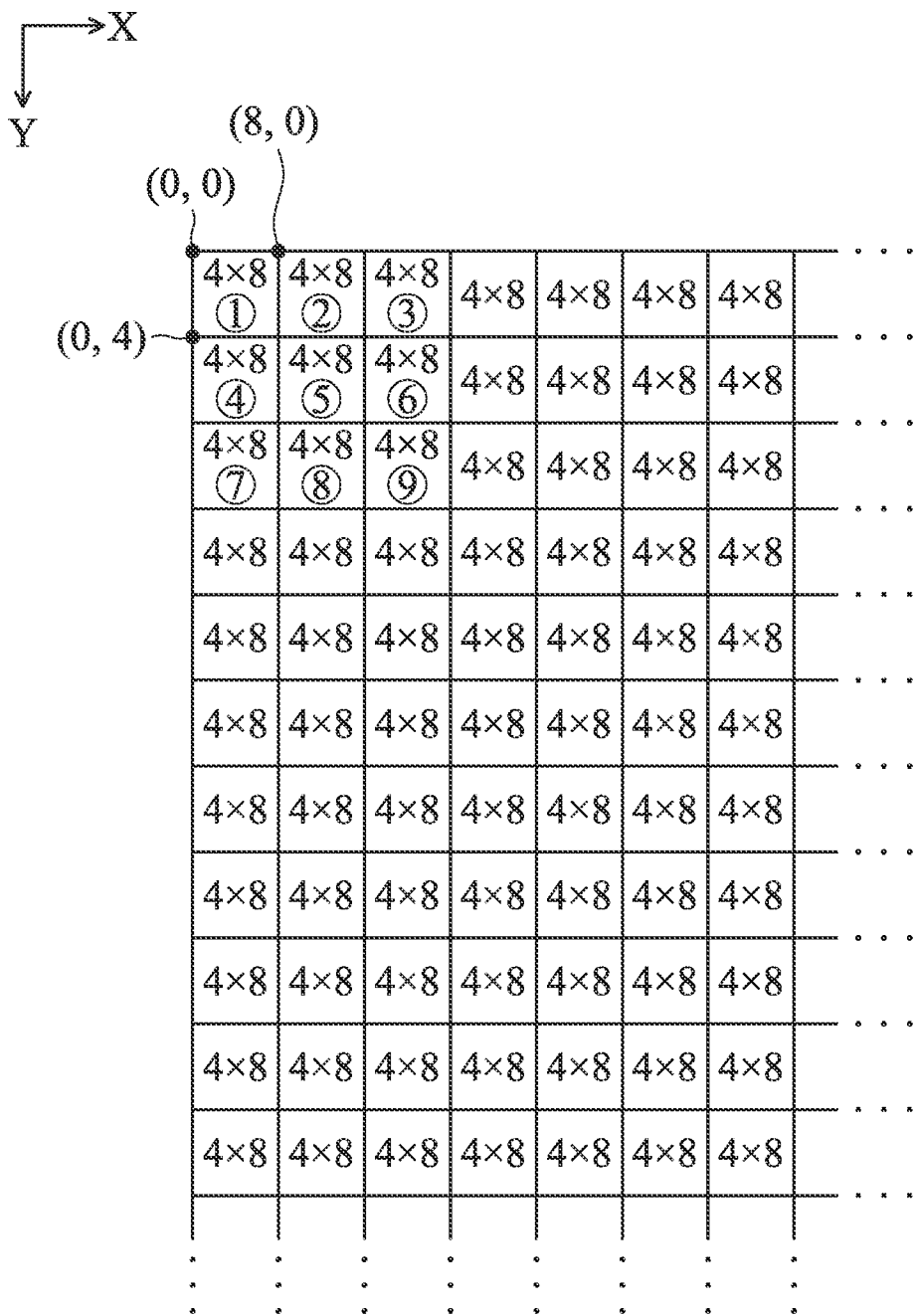
FIG. 2 is a schematic diagram of data configuration of a memory in FIG. 1 in accordance with some embodiments of the disclosure.

FIG. 2 is a schematic diagram of data configuration of a memory 106 in FIG. 1 in accordance with some embodiments of the disclosure. As shown in FIG. 2, the memory 106 includes a plurality of memory blocks, each of which is adjacent to another and is the same size. In some embodiments, the size of each of the memory blocks included in the memory is a matrix size of 4*8. In other words, each memory block is able to store data with 32 bits. Each memory block extends in the X direction and the Y direction, and defines the upper-left block (for example. a block ①) as origin coordinates (0,0) of the block configuration of the entire memory 106. For example, assuming that the size of an image is 8*16 bits, when the image is aligned with the origin coordinates and stored in the memory 106, the image is stored in the block ①, a block ②, a block ③, and a block ④. When the image is not aligned with the origin coordinates, for example, the upper-left end of the image is aligned with coordinates (4,2), the image may be stored and covered in blocks ①~⑨.

Figure 3A:
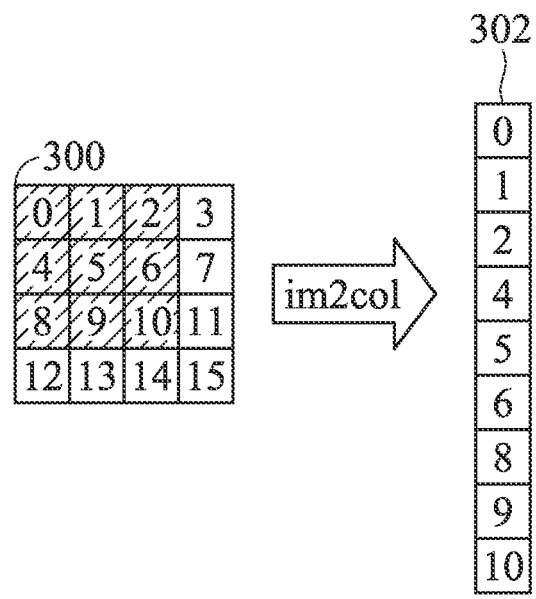
FIGS. 3A-3D are schematic diagrams of executing an im2col algorithm by an im2col module in FIG. 1 in accordance with some embodiments of the disclosure.

Back to FIG. 1, the im2col module 114 in the execution unit 104 receives the original matrix (or the original image) from the loading module 110. The im2col module 114 executes an im2col algorithm, and expands the original matrix according to the size of the kernel in the convolution calculation (or matrix multiplication calculations) to obtain an expansion matrix. FIGS. 3A-3D are schematic diagrams of executing an im2col algorithm by an im2col module 114 in FIG. 1 in accordance with some embodiments of the disclosure. As shown in FIG. 3A, the loading module 110 reads a matrix 300 from the memory 106. The matrix 300 is a 4*4 matrix with matrix elements 0~15. When the im2col module 114 receives the matrix 300 from the loading module 110, the im2col module 114 executes an im2col operation on the matrix 300. First, as shown in FIG. 3A, the im2col module 114 converts the elements 0~2, the elements 4~6, and the elements 8~10 into a 9*1 matrix 302 according to the size of a kernel (for example, the kernel is a 3*3 matrix, but the present invention is not limited thereto).

Figure 3B:
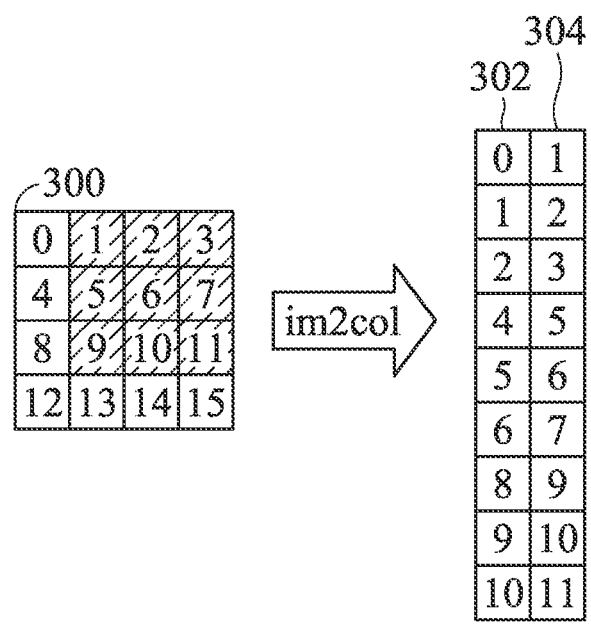
Figure 3C:
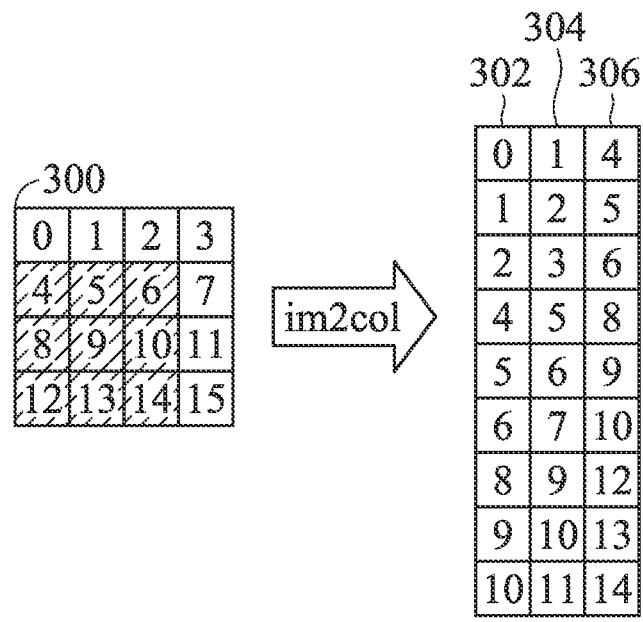
Figure 3D:
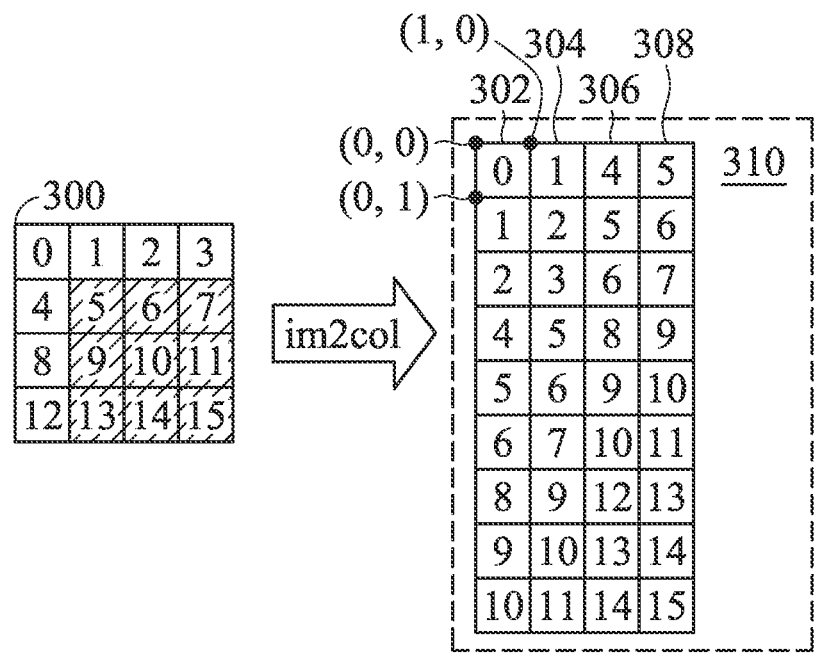

Then, in FIG. 3B, the im2col module 114 coverts the elements 1~3, the elements 5~7, and the elements 9~11 in the matrix 300 into a 9*1 matrix 304, and arranges the matrix 304 on the right side of the matrix 302. Then, as shown in FIG. 3C, the im2col module 114 converts the elements 4~6, the elements 8~10, and the elements 12~14 in the matrix 300 into a 9*1 matrix 306, and arranges the matrix 306 on the right side of the matrix 304. Finally, as shown in FIG. 3D, the im2col module 114 converts the elements 5~7, the elements 9~11, and the elements 13~15 in the matrix 300 into a 9*1 matrix 308, and arranges the matrix 308 on the right side of the matrix 306 to obtain a matrix 310. In other words, the matrix 310 including the matrices 302, 304, 306 and 308 is the expansion matrix. The im2col module 114 converts the original matrix (for example, the matrix 300) into the expansion matrix (for example, the matrix 310) for convenience of subsequent matrix multiplication.

In some embodiments, as shown in FIG. 3D, execution unit 104 defines expansion coordinates of each element in the expansion matrix (such as the matrix 310). For example, execution unit 104 defines the expansion coordinates of the first matrix element in the matrix 302 as (0,0), defines the expansion coordinates of the second matrix element in the matrix 302 as (0,1), and defines the expansion coordinates of the first matrix element in the matrix 304 as (1,0), but the present invention is not limited thereto. In some embodiments, the im2col module 114 in FIG. 1 sends the expansion coordinates of each element in the expansion matrix back to the loading module 110, so that the loading module 110 may calculate the original coordinates of the original matrix (for example, the matrix 300) in the memory 106 according to the expansion coordinates of the expansion matrix (for example, the matrix 310).

Figure 4:
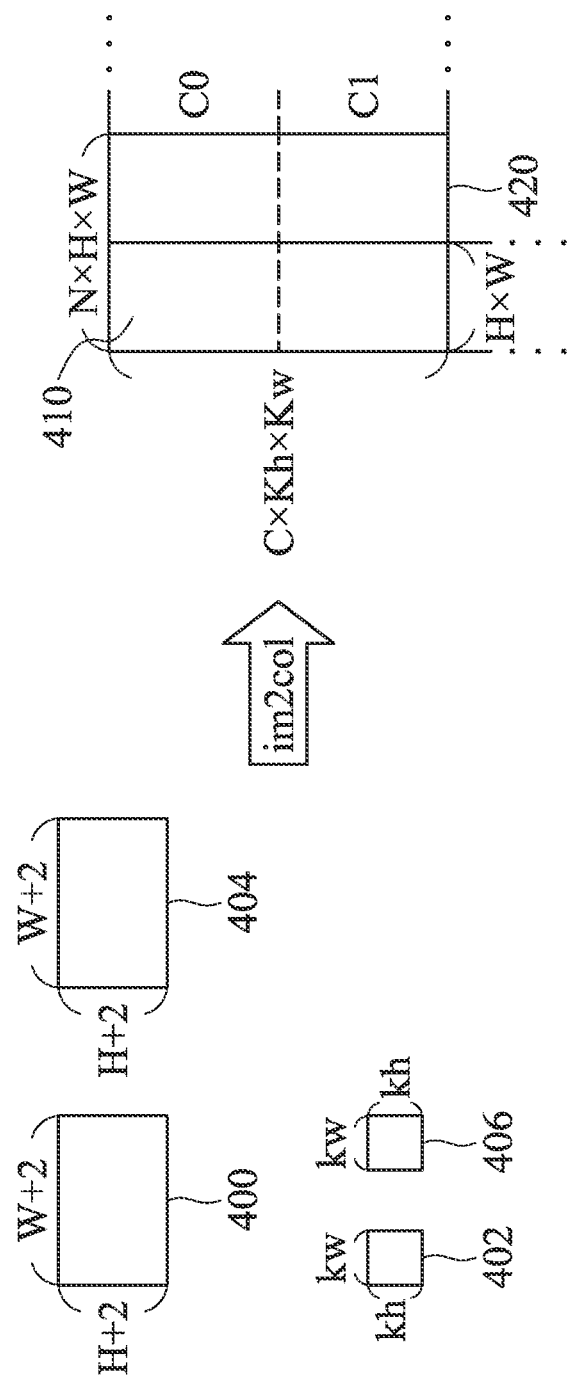
FIG. 4 is a schematic diagram of an expansion matrix of the im2col module in FIG. 1 in accordance with some embodiments of the disclosure.

FIG. 4 is a schematic diagram of an expansion matrix of the im2col module 114 in FIG. 1 in accordance with some embodiments of the disclosure. As shown in FIG. 4, the im2col module 114 of the graphics processor 100 extracts the a matrix 400 and a matrix 404 from a matrix (or an image), and the matrix 400 and the matrix 404 are both (H+2)*(W+2) matrices, wherein (H+2) is the number of matrix rows, and (W+2) is the number of matrix columns. In some embodiments, the matrix 400 and the matrix 404 can represent two different features in the image. For example, assuming that the image has the features of a dog and a cat, the matrix 400 can be represented as the features of the dog, and the matrix 404 can be represented as the features of the cat. Both a kernel 402 and a kernel 406 are kh*kw matrices, wherein kh is the number of kernel rows, and kw is the number of kernel columns. When the im2col module 114 expands the matrices 400 and 404 by the kernels 402 and 406, expansion matrices 410 and 420 in FIG. 4 are obtained. The number of matrix rows of the expansion matrices 410 and 420 are C*Kh*Kw. C is number of channels of the expansion matrix 410, Kh is the number of kernel rows of the kernels 402 and 406, and Kw is the number of kernel columns of the kernels 402 and 406.

In some embodiments, the im2col module 114 of the graphics processor 100 executes the im2col operations on the matrix 400 by the kernel 402 to obtain a matrix in a channel C0 in the expansion matrix 410. The im2col module 114 of the graphics processor 100 executes the im2col operations on the matrix 400 by the kernel 406 to obtain a matrix in a channel C1 in the expansion matrix 410. For example, if the matrix 400 can represent the features of a dog, the expansion of the matrix 400 with the kernel 402 can represent the extraction of the nose feature of the dog, and the expansion of the matrix 400 with the kernel 406 can represent the extraction of the tail feature of the dog. In simple terms, the channel C0 in the matrix 410 represents the nose feature of the dog, and the channel C1 in the matrix 410 represents the tail feature of the dog.

In some embodiments, the im2col module 114 of the graphics processor 100 executes the im2col operations on the matrix 404 by the kernel 402 to obtain a matrix in a channel C0 in the expansion matrix 420. The im2col module 114 of the graphics processor 100 executes the im2col operations on the matrix 404 by the kernel 406 to obtain a matrix in a channel C1 in the expansion matrix 420. For example, if the matrix 404 can represent the features of a cat, the expansion of the matrix 404 with the kernel 402 can represent the extraction of the nose feature of the cat, and the expansion of the matrix 404 with the kernel 406 can represent the extraction of the tail feature of the cat. In simple terms, the channel C0 in the matrix 420 represents the nose feature of the cat, and the channel C1 in the matrix 420 represents the tail feature of the cat. In some embodiments, the number of channels (C) may represent the number of sub-features of the matrix 400 and the matrix 404 respectively. In the example in FIG. 4, the number of channels (C) is 2, that is, the channels C0 and C1, but the present invention is not limited thereto.

The number of matrix columns of the expansion matrices 410 and 420 is H*W. Since the im2col module 114 of the graphics processor 100 in FIG. 4 expands the matrix 400 and the matrix 404 (that is, two features), the total number of rows of the obtained expansion matrix (the expansion matrices 410 and 420) is N*H*W, wherein N is equal to 2, but the present invention is not limited thereto. In some embodiments, N is also called the number of batches. The number of batches represents the number of images that need to be recognized. For example, the matrix 400 and the matrix 404 in FIG. 4 need to be recognized. In conclusion, the size of the expansion matrix (such as the matrices 410 and 420) depends on the size and the number of the original matrix (such as the matrices 400 and 404), and the size and the number of the kernel (such as the kernels 402 and 406).

Figures 5A, 5B:
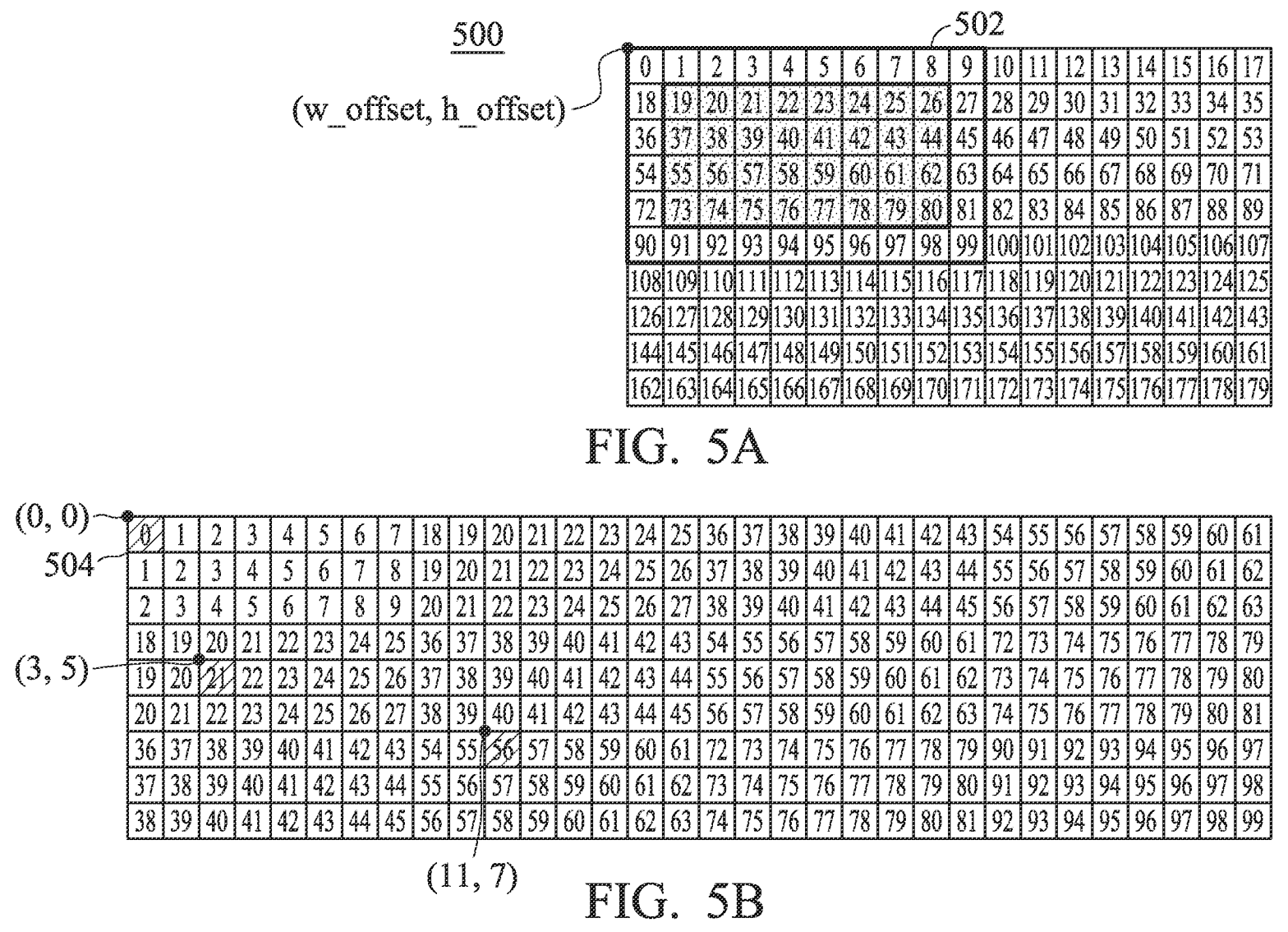

FIG. 5A is a schematic diagram of an original matrix in accordance with some embodiments of the disclosure. FIG. 5B is a schematic diagram of the expansion matrix of the original matrix in FIG. 5A in accordance with some embodiments of the disclosure. As shown in FIGS. 5A and 5B, the im2col module 114 of the graphics processor 100 extracts a matrix 502 from an original matrix 500, executes an im2col algorithm, and expands the matrix 502 by a 3*3 kernel to obtain an expansion matrix 504. In other words, the expansion matrix 504 is an expansion matrix of the matrix 502. The execution unit 104 defines expansion coordinates of each element in the expansion matrix 504. For example, the execution unit 104 defines the expansion coordinates of an element 0 in the first row and the first column of the expansion matrix 504 as (0,0), defines the expansion coordinates of an element 21 in the fifth row and the third column of the expansion matrix 504 as (3,5), and defines the expansion coordinates of an element 56 in the seventh row and the eleventh column as (11,7).

Then, the im2col module 114 sends the expansion coordinates of each element in the expansion matrix 504 to the loading module 110 in the texel unit 102 in FIG. 1 (as shown by the dotted arrow between the loading module 110 and the im2col module 114 in FIG. 1), so that the loading module 110 can calculate the original coordinates of the original matrix (such as the matrix 502) in the memory 106 according to the expansion coordinates of the expansion matrix (such as the matrix 504). The loading module 110 receives the expansion coordinates (such as coordinates (X,Y)) from the execution unit 104, and first calculates which channel each element of the expansion matrix 504 is located in (for example, the number of channels (C) in FIG. 4) of the expansion matrix 504 by using an equation 1.

$$C_{in}=[Y/(K_w*K_h)] \qquad \text{Equation 1}$$

$C_{in}$ is channels of the expansion matrix. Kw is the number of kernel columns, and Kh is the number of kernel rows. $C_{in}$ is the value obtained by rounding down (Y/(Kw*Kh)). In the embodiment of FIG. 5B, Kw and Kh are both 3. For example, if the loading module 110 would like to calculate which channels the element 21 in the fifth row and the third column is located in, then Y=5, Kw=3, and Kh=3 are substituted into the equation 1, $C_{in}$=0 can be obtained. In other words, the loading module 110 can know that the element 21 in the fifth row and the third column falls in the channel 0 (since the im2col module 114 only uses a 3*3 kernel to expand the matrix 502, the expansion matrix 504 has one channel).

Next, the loading module 110 calculates that how many channels need to be read from the expansion matrix 504 to form a matrix with a pre-determined size (for example, a 32*32 matrix or a 16*16 matrix). In the embodiment of FIG. 5B, since the expansion matrix has only one channel, the loading module 110 directly reads the expansion matrix 504 from the im2col module 114.

Furthermore, the loading module 110 calculates that how many batches do the expansion matrix 504 have by an equation 2, which is called a batch index.

$$\text{Batch index}=[X/(H*W)] \qquad \text{Equation 2}$$

In the embodiments of FIG. 5B, X is the X coordinate of each element of the expansion matrix 504, H is equal to the number of rows of the matrix 502 minus 2, and W is equal to the number of columns of the matrix 502 minus 2. The batch index is the value obtained by rounding down (X/(H*W)). For example, the loading module 110 would like to calculate which batch the element 21 in the fifth row and the third column of the expansion matrix 504 is located in, then X=3, H=4, and W=8 are substituted into the equation 2 to obtain that the element 21 in the fifth row and the third column in the expansion matrix 504 is in a batch 0. In the embodiment of FIG. 5B, the expansion matrix 504 only has one batch, but the present invention is not limited thereto.

Figure 5C:
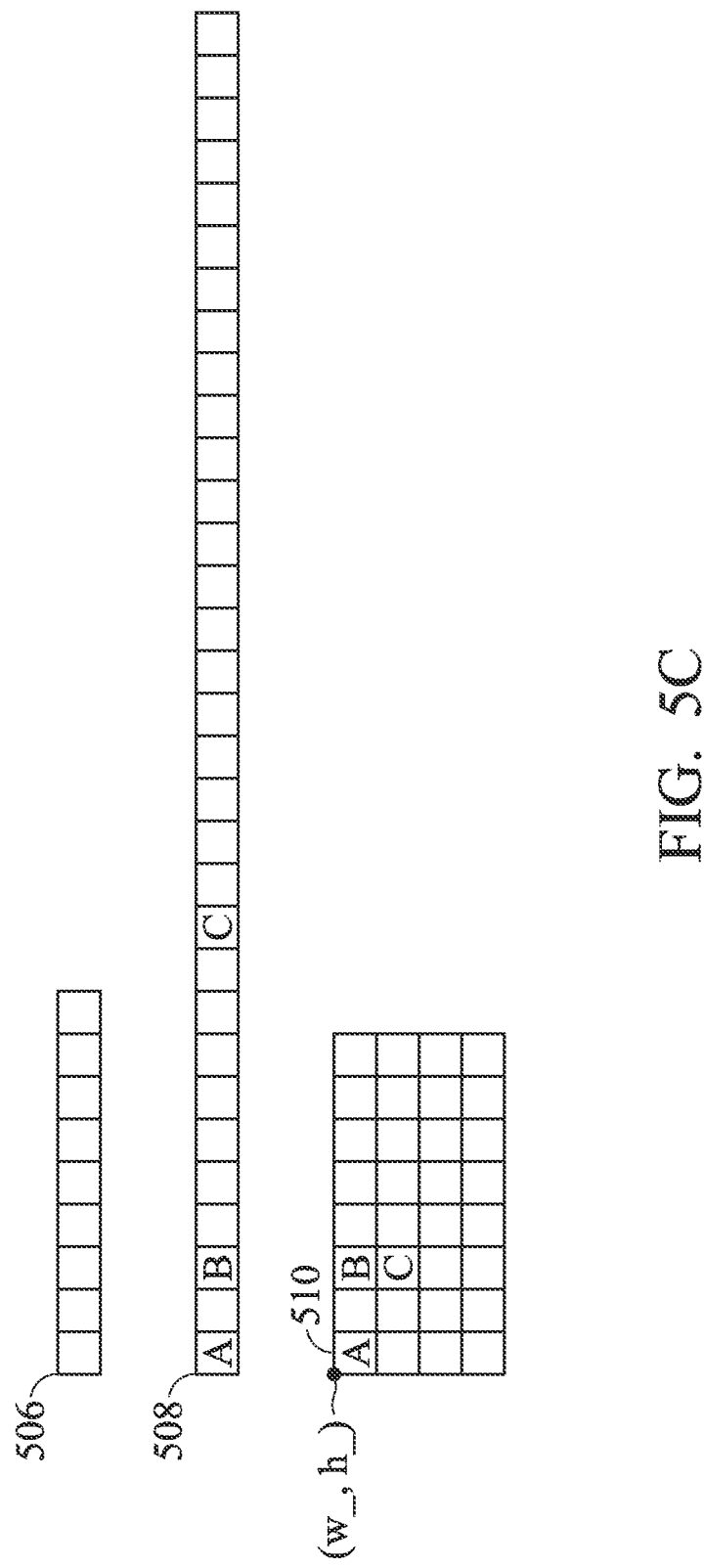
FIG. 5C is a schematic diagram of a kernel and a feature map matrix in accordance with some embodiments of the disclosure.

FIG. 5C is a schematic diagram of a kernel and a feature map matrix in accordance with some embodiments of the disclosure. As shown in FIG. 5C, execution unit 104 coverts the 3*3 kernel used for expanding the matrix 502 in FIG. 5A into a 1*9 kernel 506. The execution unit 104 executes the matrix multiplication on the expansion matrix 504 in FIG. 5B and the kernel 506 in FIG. 5C to obtain a 1*32 feature map matrix 508. Next, the loading module 110 divides the $1^{st}$ to $8^{th}$ elements in the feature map matrix 508 into a first group, the $9^{th}$ to $16^{th}$ elements into a second group, the $17^{th}$ to $24^{th}$ elements into a third group, and $25^{th}$ to $32^{nd}$ elements into a fourth group. The execution unit 104 converts the 1*32 feature map matrix 508 into a 4*8 feature map matrix 510 according to the combination of the elements of the first group, the second group, the third group, and the fourth group.

In some embodiments, the loading module 110 then calculates the index of the 4*8 feature map matrix 510 in the tensor space composed of a plurality of 4*8 blocks according to the expansion coordinates of each element of the expansion matrix 504, the index is also called a tile index. The loading module 110 calculates the value of the tile index by the following equation 3.

$$\text{Tile index} = \left[\frac{X}{32}\right] \% \,[(\text{Align8\_Width} >> 3) * (\text{Align4\_Height} >> 2)] \quad \text{Equation 3}$$

X is the X coordinate of each element of the expansion matrix 504. % represents taking the remainder. Align8_Width>>3 represents the X coordinate obtained by shifting right the 4*8 blocks of 3 grids in the tensor space (for example, the X direction of FIG. 2). Align4_Height>>2 represents the Y coordinate obtained by shifting down the 4*8 blocks of 2 grids in the tensor space (for example, the Y direction of FIG. 2). In the embodiments of FIG. 5B, since the X coordinates of the element 0 in the first row and the first column, the element 21 in the fifth row and the third column, and the element 56 in the seventh row and the eleventh column in the expansion matrix 504 are all less than 32, the tile indexes of the elements, which are respectively corresponding to the element 0 in the first row and the first column, the element 21 in the fifth row and the third column, and the element 56 in the seventh row and the eleventh column in the expansion matrix 504, in the 4*8 feature map matrix 510 in FIG. 5C are all 0. For example, the element A in the feature map matrix 510 corresponds to the element 0 in the expansion matrix 504, the element B in the feature map matrix 510 corresponds to the element 21 in the expansion matrix 504, and the element C in the feature map matrix 510 corresponds to the element 56 in the expansion matrix 504.

Then, the loading module 110 calculates starting coordinates (w_, h_) of the 4*8 feature map matrix 510 in FIG. 5C in the entire tensor space composed of a plurality of 4*8 blocks by an equation 4. The starting coordinates (w_, h_) are one of feature coordinates of all elements in the feature map matrix 510.

$$w\_=(\text{Tile\_index}<<3)\% \,\text{Align8\_Width} \quad h\_=\{[(\text{Tile\_index}<<3)/\text{Align8\_Width}]\}<<2 \quad \text{Equation 4}$$

Tile_index<<3 represents the X coordinates obtained by shifting left the 4*8 blocks of 3 grids from the numerical coordinates of the tile index. In the embodiments of FIG. 5B and FIG. 5C, since the value of the tile index is 0, the starting coordinates (w_,h_) of the feature map matrix 510 in the tensor space is equal to (0,0).

The loading module 110 calculates starting coordinates (w_offset, h_offset) of the matrix 502 in the memory 106 in FIG. 5A by an equation 5 according to the starting coordinates (w_, h_) of the feature map matrix 510 in FIG. 5C.

$$w\_\text{offset}=w\_*\text{stride}\_w-\text{pad}\_w$$

$$h\_\text{offset}=h\_*\text{stride}\_h-\text{pad}\_h \quad \text{Equation 5}$$

stride_w and stride_h are strides for the convolution calculation. pad_w and pad_h are padding for the convolution calculation. In the embodiments of FIG. 5A, FIG. 5B and FIG. 5C, stride_w=stride_h=1, pad_w=pad_h=0. Therefore, the loading module 110 converts the starting coordinates (w_, h_) of the feature map matrix 510 into the starting coordinates (w_offset, h_offset) of the matrix 502 in FIG. 5A by the equation 5, that is, (w_offset, h_offset)=(0,0). In some embodiments, the starting coordinates of the present invention are defines as the coordinates of the upper-left element in the matrix. In some embodiments, the equation 5 can be calculated by the execution unit 104, and the execution unit 104 then sends the calculation result to the loading module 110.

In some embodiments, the loading module 110 further calculates which 4*8 blocks of the memory 106 each element of the matrix 502 is distributed in according to the starting coordinates (w_offset, h_offset) of the matrix 502 in the memory 106. Next, the loading module 110 reads those 4*8 blocks storing at least one element of the matrix 502 to send the data corresponding to the starting coordinates or the other coordinates of the matrix 502 to the im2col module 114.

Back to FIG. 1, in the convolution calculation, the L1 cache 112 reads and stores the original matrix (for example, the matrix 500 and the matrix 502) used for convolution calculation from the memory 106 for loading-module 110 access (for example, the dotted arrow between the loading module 110 and the L1 cache 112). In some embodiments, when the loading module 110 cannot find the data corresponding to the starting coordinates of the matrix 502 or the other coordinates of the matrix 502 in the L1 cache 112, the L1 cache 112 sends a request to an L2 cache (not shown), so that the L2 cache may send the data corresponding to the starting coordinates of the matrix 502 or the other coordinates of the matrix 502 to the L1 cache 112. In some embodiments, the L2 cache is arranged between the L1 cache 112 and the memory 106, and is electrically connected to the L1 cache 112 and the memory 106.

In some embodiments, when the loading module 110 still cannot find the data corresponding to the starting coordinates of the matrix 502 or the other coordinates of the matrix 502 in the L2 cache, the L2 cache sends a request to the memory 106, so that the memory 106 may send the data corresponding to the starting coordinates of the matrix 502 or the other coordinates of the matrix 502 to the L2 cache, and the L2 cache then sends the data to the L1 cache 112. Finally, the loading module 110 can find the data corresponding to the starting coordinates of the matrix 502 or the other coordinates of the matrix 502 in the L1 cache 112. In some embodiments, when the loading module 110 finds the data corresponding to the starting coordinates of the matrix 502 or the other coordinates of the matrix 502 in the L1 cache 112, the loading module 110 sends the data to the im2col module 114 in the execution unit 104.

In FIG. 1, the register file 116 is used to store the data in the original matrix (for example, the matrices 500 and 502 in FIG. 5A), the data in the expansion matrix (for example, the matrix 504 in FIG. 5B), and the data in the feature map matrix (for example, the feature map matrix 510 in FIG. 5C) from the im2col module 114 in the convolution calculation. In some embodiments, the execution module 118 executes the convolution calculation according to the data in the original matrix (for example, the matrices 500 and 502 in FIG. 5A), the data in the expansion matrix (for example, the matrix 504 in FIG. 5B), and the data in the feature map matrix (for example, the feature map matrix 510 in FIG. 5C). In some embodiments, the storage unit 108 stores the result of the convolution calculation executed by the execution unit 104 into the memory 106.

Figure 6:
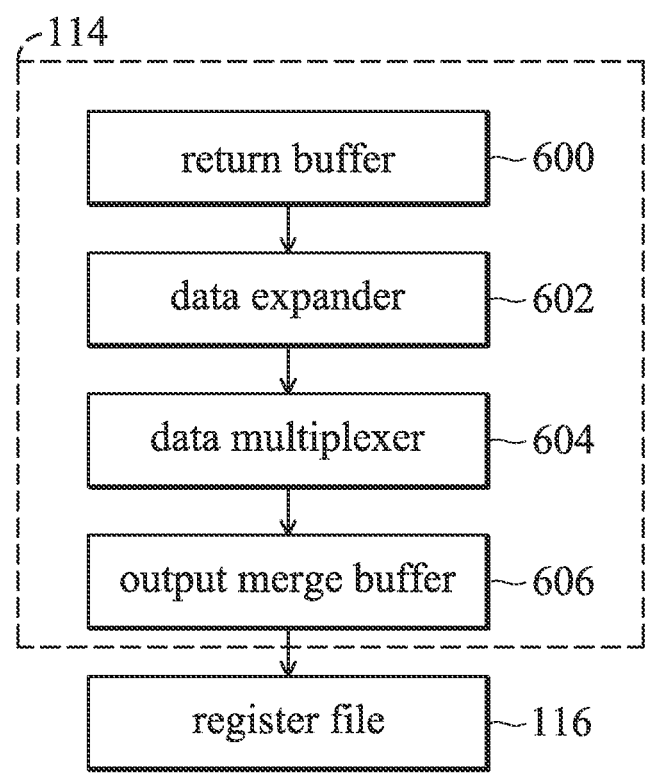
FIG. 6 is a schematic diagram of the im2col module in FIG. 1 in accordance with some embodiments of the disclosure.

FIG. 6 is a schematic diagram of the im2col module 114 in FIG. 1 in accordance with some embodiments of the disclosure. As shown in FIG. 6, the im2col module 114 includes a return buffer 600, a data expander 602, a data multiplexer 604, and an output merge buffer 606. In some embodiments, the return buffer 600 receives and stores the data of the original matrix (for example, the matrices 500 and 502 in FIG. 5A) from the texel unit 102 in FIG. 1, or the data corresponding to the original coordinates in the memory blocks from the texel unit 102 (for example, the data in the element located at the coordinates (w_offset, h_offset) in the matrix 500 in FIG. 5A). The data expander 602 expands the original matrix using an im2col operation (for example, by executing an im2col algorithm) to obtain an expansion matrix (for example, the expansion matrix 504 in FIG. 5B) corresponding to the original matrix. The data multiplexer 604 selects the data required for the convolution calculation by the execution unit 104 in the expansion matrix (for example, the data in the element 0 in the first row and the first column, the data in the element 21 in the fifth row and the third column, and the data in the element 56 in the seventh row and the eleventh column in the expansion matrix 504 in FIG. 5B). The output merge buffer 606 combines the data in the expansion matrix selected by the data multiplexer 604, and outputs to the register file 116.

Figure 7:
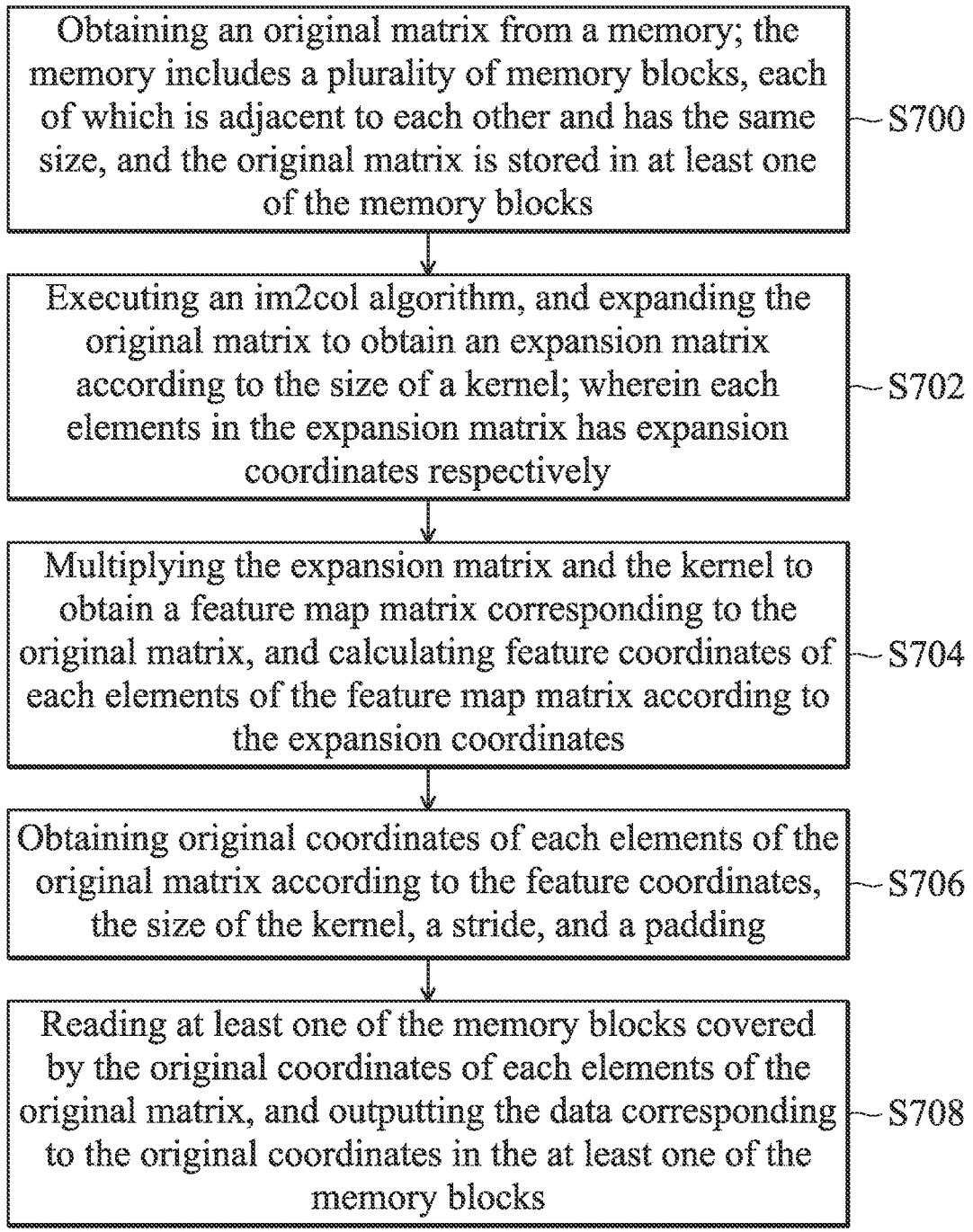
FIG. 7 is a flow chart of accelerating a convolution calculation by the graphics processor in FIG. 1 in accordance with some embodiments of the disclosure.

FIG. 7 is a flow chart of accelerating a convolution calculation by the graphics processor 100 in FIG. 1 in accordance with some embodiments of the disclosure. The method for accelerating a convolution calculation disclosed in the present invention includes obtaining an original matrix from a memory, wherein the memory includes a plurality of memory blocks, which are adjacent to each other and are the same size, and the original matrix is stored in at least one of the memory blocks (step S700); executing an im2col algorithm, and expanding the original matrix to obtain an expansion matrix according to the size of a kernel, wherein each element in the expansion matrix has expansion coordinates (step S702); multiplying the expansion matrix and the kernel to obtain a feature map matrix corresponding to the original matrix, and calculating feature coordinates of each element of the feature map matrix according to the expansion coordinates (step S704); obtaining original coordinates of each element of the original matrix according to the feature coordinates, the size of the kernel, a stride, and padding (step S706); and reading at least one of the memory blocks covered by the original coordinates of each element of the original matrix, and outputting the data corresponding to the original coordinates in the memory blocks (step S708).

In some embodiments, the loading module 110 in the texel unit 102 in FIG. 1 executes step S700. The im2col module 114 in the execution unit 104 in FIG. 1 executes step S702. The execution unit 104 in FIG. 1 (or the im2col module 114 in the execution unit 104) executes "multiplying the expansion matrix and the kernel to obtain a feature map matrix corresponding to the original matrix" in step S704. The loading module 110 in the texel unit 102 in FIG. 1 executes "calculating feature coordinates of each element of the feature map matrix according to the expansion coordinates" in step S704. The loading module 110 in the texel unit 102 in FIG. 1 also executes steps S706 and S708. The graphics processor 100 and the method for accelerating the convolution calculation of the present invention use special hardware (for example, FIG. 6) to perform the im2col function, and achieve the data preparation for usage of convolution calculation in time, thus the bandwidth requirement for data is reduces, and the efficiency of inference is improved.

The present invention further adjusts the data storage method (as shown in FIG. 2) to facilitate the realization of the im2col function with hardware, and ultimately achieve the purpose of reducing the number of inference layers and saving memory bandwidth. By defining a new data storage method, the hardware loading module (loading module 110 in FIG. 1) and the data expansion module (the im2col module 114 in FIG. 1) of the present invention can successfully reduce the inference time by more than 20% and improve the waste of bandwidth when the im2col function is executed.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. An electronic device, comprising:
a graphics processor, configured to accelerate a convolution calculation, configured to:
read an original matrix used for the convolution calculation from a memory outside the graphics processor; wherein the memory comprises a plurality of memory blocks, each of which is adjacent to another and is the same size, and the original matrix is stored by a specific data configuration in at least one of the memory blocks;
execute an im2col algorithm, expand the original matrix to obtain an expansion matrix according to a size of a kernel, and define expansion coordinates of each element in the expansion matrix;
multiply the expansion matrix and the kernel to obtain a feature map matrix corresponding to the original matrix;
receive the expansion coordinates, calculate feature coordinates of each element of the feature map matrix according to the expansion coordinates, and obtain original coordinates of each element of the original matrix according to the feature coordinates, the size of the kernel, a stride, and padding; and
read the at least one of the memory blocks covered by the original coordinates of each element of the original matrix, and sends data corresponding to the original coordinates in the at least one of the memory blocks into the im2col algorithm;
wherein the graphics processor comprises:
a return buffer, receiving and storing data of the original matrix, or the data corresponding to the original coordinates in the at least one memory blocks;
a data expander, expanding the original matrix using an im2col operation to obtain the expansion matrix;
a data multiplexer, selecting data required for the convolution calculation in the expansion matrix according to the graphics processor; and
an output merge buffer, combining the data in the expansion matrix selected by the data multiplexer, and outputting the combined data selected by the data multiplexer to a register file.

2. The electronic device as claimed in claim 1, wherein the graphics processor further comprises the register file, to store the data in the original matrix, data in the expansion matrix, and data in the feature map matrix in the convolution calculation.

3. The electronic device as claimed in claim 2, wherein the graphics processor executes the convolution calculation according to the data in the original matrix, the data in the expansion matrix, and the data in the feature map matrix in the register file.

4. The electronic device as claimed in claim 1, wherein the graphics processor further comprises an L1 cache; in the convolution calculation, the L1 cache reads and stores the original matrix for the convolution calculation from the memory for the graphics processor to access.

5. The electronic device as claimed in claim 1, wherein the graphics processor further comprises a second memory, to store a result of the convolution calculation executed by the graphics processor in the memory.

6. The electronic device as claimed in claim 1, wherein a size of each memory block included in the memory is a matrix size of 4*8.

7. The electronic device as claimed in claim 1, wherein the size of the kernel is a matrix size of 3*3, the stride is equal to 1, and the padding is equal to 0.

8. A method for accelerating a convolution calculation, applied to a graphics processor, comprising:
  the graphics processor receiving an original matrix from a memory outside the graphics processor; wherein the memory comprises a plurality of memory blocks, each of which is adjacent to another and is the same size, and the original matrix is stored by a specific data configuration in at least one of the memory blocks;
  the graphics processor executing an im2col algorithm, and expanding the original matrix to obtain an expansion matrix according to a size of a kernel; wherein each element in the expansion matrix has expansion coordinates;
  the graphics processor multiplying the expansion matrix and the kernel to obtain a feature map matrix corresponding to the original matrix;
  the graphics processor calculating feature coordinates of each element of the feature map matrix according to the expansion coordinates;
  the graphics processor obtaining original coordinates of each element of the original matrix according to the feature coordinates, the size of the kernel, a stride, and padding;
  the graphics processor reading the at least one of the memory blocks covered by the original coordinates of each element of the original matrix, and outputting data corresponding to the original coordinates in the at least one of the memory blocks;
  wherein the step of executing the im2col algorithm comprises:
  receiving and storing by a return buffer data of the original matrix, or the data corresponding to the original coordinates in the at least one memory blocks;
  expanding by a data expander the original matrix using an im2col operation to obtain the expansion matrix;
  selecting by a data multiplexer data required for the convolution calculation in the expansion matrix according to the graphics processor;
  combining by an output merge buffer the data in the expansion matrix selected by the data multiplexer, and outputting the combined data selected by the data multiplexer to a register file.

9. The method as claimed in claim 8, wherein the step of executing the im2col algorithm further comprises storing by the register file the data in the original matrix, data in the expansion matrix, and data in the feature map matrix in the convolution calculation.

10. The method as claimed in claim 9, wherein the step of executing the im2col algorithm further comprises executing by the graphics processor the convolution calculation according to the data in the original matrix, the data in the expansion matrix, and the data in the feature map matrix in the register file.

11. The method as claimed in claim 8, wherein the step of executing the im2col algorithm further comprises reading and storing by an L1 cache the original matrix for the convolution calculation from the memory for the graphics processor to access in the convolution calculation.

12. The method as claimed in claim 8, wherein the step of executing the im2col algorithm further comprises storing by a second memory a result of the convolution calculation executed by the graphics processor in the memory.

13. The method as claimed in claim 8, wherein a size of each memory block included in the memory is a matrix size of 4*8.

14. The method as claimed in claim 8, wherein the size of the kernel is a matrix size of 3*3, the stride is equal to 1, and the padding is equal to 0.

* * * * *